United States Patent [19]
Yamashita et al.

[11] Patent Number: 5,144,434
[45] Date of Patent: Sep. 1, 1992

[54] VIDEO SIGNAL PROCESSING DEVICE USING LOOK-UP TABLE

[75] Inventors: Shinichi Yamashita, Kanagawa; Mitsugu Tanaka, Tokyo, both of Japan

[73] Assignee: Canon Kabushiki Kaisha, Tokyo, Japan

[21] Appl. No.: 550,284

[22] Filed: Jul. 9, 1990

[30] Foreign Application Priority Data

Jul. 13, 1989 [JP] Japan .................. 1-182027
Jul. 13, 1989 [JP] Japan .................. 1-182028
Jul. 13, 1989 [JP] Japan .................. 1-182029
Jul. 13, 1989 [JP] Japan .................. 1-182030

[51] Int. Cl.$^5$ .............................................. H04N 5/14
[52] U.S. Cl. ..................... 358/166; 358/14; 358/37; 358/340; 364/718
[58] Field of Search ............. 358/166, 37, 315, 316, 358/318, 340, 36, 905, 167, 314, 328, 336, 41, 43, 44; 364/718, 722, 724.17; 455/43, 72

[56] References Cited

U.S. PATENT DOCUMENTS

| | | | |
|---|---|---|---|
| 4,264,918 | 4/1981 | Aschwanden | 358/14 |
| 4,549,213 | 10/1985 | Illetschko | 358/36 |
| 4,597,021 | 6/1986 | Yamamitsu | 358/340 |
| 4,635,098 | 1/1987 | Thong | 358/14 |
| 4,636,863 | 1/1987 | Kaizaki | 358/36 |
| 4,658,305 | 4/1987 | Tsushima | 358/327 |
| 4,668,988 | 5/1987 | Sasaki | 358/166 |
| 4,677,486 | 6/1987 | Noda | 358/166 |
| 4,750,051 | 6/1988 | Kaneko | 358/14 |
| 4,760,449 | 7/1988 | Matsumoto | 358/167 |
| 4,926,361 | 5/1990 | Ohtsubo | 358/36 |
| 4,941,055 | 7/1990 | Fujimoto | 358/340 |

FOREIGN PATENT DOCUMENTS

0267785 5/1988 European Pat. Off. .
0158785 8/1985 Japan .
0208191 10/1985 Japan .

*Primary Examiner*—James J. Groody
*Assistant Examiner*—Sherrie Hsia
*Attorney, Agent, or Firm*—Robin, Blecker, Daley & Driscoll

[57] ABSTRACT

A video signal processing device is arranged to supply a digital video signal to an infinite impulse response digital filter, to supply the digital video signal from the filter to a look-up table circuit which has a non-linear input-output characteristic, and to emphasize a high-frequency component of the digital video signal by adding the output signal of the look-up table circuit to the digital video signal supplied to the filter, so that a non-linearly emphasizing process can be accomplished at a high speed on the digital video signal. Further, in the video signal processing device, a look-up table circuit is arranged to look up a table by using as an address the output signal of a first subtractor which receives a high-frequency-component-emphasized digital video signal as one of its inputs and to have a non-linear input-output characteristic, the output signal of the look-up table circuit is subtracted from the high-frequency-component-emphasized digital video signal to obtain a high-frequency-component-suppressed digital video signal, the video signal thus obtained is supplied to an infinite impulse response digital filter, and the output signal of the filter is supplied to the first subtracter as its other input, so that the digital video signal can be non-linearly deemphasized at a high speed.

14 Claims, 15 Drawing Sheets

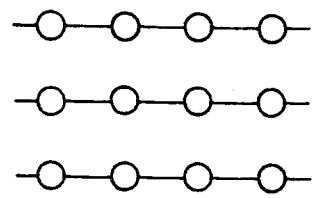
FIG.19(A)
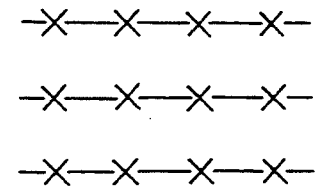
FIG.19(B)
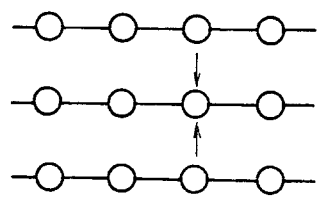
FIG.19(C)
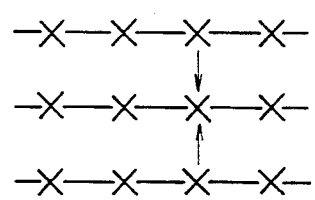
FIG.19(D)
n-3 —O—O—O—O—
n-2 —X—X—X—X—
n-1 —O—O—O—O—
n  —X—X—X—X—
FIG.19(E)

VIDEO SIGNAL PROCESSING DEVICE USING LOOK-UP TABLE

BACKGROUND OF THE INVENTION

1. Field of the Invention

This invention relates to a video signal processing device and more particularly to a video signal processing device having a non-linear emphasis circuit or a non-linear deemphasis circuit.

2. Description of the Related Art

A circuit arranged as shown in FIG. 1 of the accompanying drawings has been proposed as a non-linear emphasis circuit to be applied to a system for transmitting a video signal through a transmission line which has its dynamic range limited because of much noise. Meanwhile a non-linear deemphasis circuit which is arranged as shown in FIG. 2 has also been proposed.

Referring to FIG. 1, an input video signal x is supplied to a high-pass filter (hereinafter referred to as HPF) 41. The high-frequency component of the video signal is separated by the HPF 41. The high-frequency component as separated is amplitude-compressed by a non-linear amplifier (hereinafter referred to as NLA) 42. The NLA 42 has an input-output characteristic as shown in FIG. 3. The input-output characteristic is such that the output amplitude is limited when an input signal has a large amplitude. The output w of the NLA 42 is added by an addition circuit 43 to the input video signal x. As a result, a signal y in which a high-frequency component is emphasized is output from the addition circuit 43. In the case of FIG. 1, the HPF 41 is, for example, composed of a capacitor and a resistor (C and R). The NLA 42 is, for example, composed of a logarithmic compression circuit which uses, for example, a diode.

The frequency characteristic of the output y is a so-called non-linear emphasis characteristic in which the emphasized degree of the high-frequency component varies with the input level as shown in FIG. 4.

The video signal which has its high-frequency component emphasized is fraught with noises as in the case of magnetic recording and reproduction by a VTR. Therefore, the video signal is supplied through a transmission line of a limited dynamic range to a deemphasis circuit which is of a characteristic reverse to that of the above-stated emphasis circuit. The high-frequency component which has been emphasized is suppressed. By this, a noise component added through the transmission line is suppressed, so that an image of high S/N ratio can be obtained. Further, since the degree of emphasis for a high-level signal is small, the dynamic range of the transmission line is never increased for the high-level signal. In that case, therefore, no distortion is brought about by the limitation imposed on the dynamic range of the transmission line.

The deemphasis circuit is arranged as follows: Referring to FIG. 2, an input x' is supplied to a subtracter 53. The output of the subtracter 53 is obtained as a deemphasis output y'. The output y' is supplied to an HPF 41 and an NLA 42 to obtain a high-frequency component w which is amplitude-compressed. The amplitude-compressed high-frequency component is fed back to the subtracter 53. If the characteristic of the HPF 41 and that of the NLA 42 are the same as those of the HPF 41 and the NLA 42 of the emphasis circuit of FIG. 1, the transmission characteristics of the circuits shown in FIGS. 1 and 2 are reverse to each other and the transmission characteristic obtained through the two circuits would completely become "1".

The emphasis and deemphasis circuits of the above-stated characteristics necessitate the use of non-linear amplitude compressors such as logarithmic diode compressors. Generally, however, it has been difficult to obtain a high degree of accuracy, stability and an adequate high-frequency characteristic with the emphasis circuit of such a characteristic. Further, the deemphasis circuit which is arranged in a feedback circuit requires use of a logarithmic compressor having a frequency characteristic which remains stable for a wide band.

Therefore, it has been difficult to use such emphasis and deemphasis circuits for an apparatus that is required to process signals at a high degree of precision over a wide frequency band, such as a VTR of the kind intended to record such a wide-band signal as a high-definition TV signal or the like.

Generally, the apparatus of the kind recording and reproducing color video signals on and from magnetic recording media are contrived in varied manners to be capable of recording and reproducing the video signal for as long a period of time as possible. In one of known methods applicable to a color signal which is not much affected in terms of visual image quality, color-difference signals of two kinds are recorded as a line-sequential color-difference signal by alternately skipping them on each line.

Further, in recording the video signal on a recording medium as mentioned above, the high-frequency component is emphasized or intensified for the purpose of preventing the deterioration thereof. Then, in reproducing the signal, a so-called deemphasizing process is performed in a manner reverse to the emphasizing process. For a color signal, it is also known to perform non-linear emphasis and deemphasis processes for changing the degree of emphasis according to the level of the signal for the purpose of effectively utilizing the dynamic range of the signal.

FIG. 5 shows in outline the arrangement of the conventional magnetic recording and reproducing apparatus which is arranged to perform a line-sequential conversion process on the color-difference signals and also the non-linear emphasis and deemphasis processes. Referring to FIG. 5, terminals 21 and 22 are arranged to receive the color-difference signals of two kinds respectively. The color-difference signals as received are supplied respectively to non-linear emphasis circuits (hereinafter referred to as NLE circuits) 23 and 24. The NLE circuits 23 and 24 are arranged to emphasize the high-frequency components of the color-difference signals at a rate determined according to their levels. Their outputs are supplied to a line-sequential conversion processing circuit (hereinafter referred to as an LSC circuit) 25. The LSC circuit 25 is arranged to alternately produce, as a line-sequential color-difference signal for every line, the color-difference signals which are received through the NLE circuits 23 and 24. The line-sequential color-difference signal is supplied to a magnetic recording/reproducing system 27. For the sake of simplification of illustration, a luminance signal is omitted from FIG. 5. However, the luminance signal is of course arranged to be recorded on a recording medium together with the line-sequential color-difference signal.

The line-sequential color-difference signal which is reproduced by the magnetic recording/reproducing system is supplied to the LSC circuit 29 to be subjected to a process called a simultaneous-conversion process. In other words, a process of forming the color-difference signal of all lines from the color-difference signal obtained from every other line is performed on each of the color-difference signals of the two kinds. The color-difference signals of the two kinds thus obtained are supplied to non-linear deemphasis circuits (hereinafter referred to as NLDE circuits) 31 and 32 respectively. At these circuit 31 and 32, the emphasized high-frequency components are compressed and, after that, are output from output terminals 33 and 34.

With the conventional apparatus arranged as described above, any color-difference signal that has a high frequency and is at a low level is sufficiently emphasized before recording or reproduction. The signal thus can be prevented from being deteriorated by the process of the magnetic recording/reproducing system.

By the above-stated line-sequential conversion process, the sampling frequency in the vertical direction of the image is lowered. It is, therefore, preferable to suppress an aliasing noise by limiting the band of the original signal in the vertical direction of the image to a level below the Nyquist frequency before the line-sequential conversion process.

However, when the LSC circuit 25 of FIG. 5 limits the band of the image signal in the vertical direction, the level of the signal which has undergone the non-linear emphasis process sometimes comes to change at a part of the original image where the vertical resolution is high. As is well known, the degree of emphasis varies to a great degree according to the signal level through the NLE process. Therefore, in a case where the signal level changes to a great degree in the latter stage of the NLE process, the degree of attenuation of the high-frequency component obtained at the NLDE circuit no longer corresponds to the degree of emphasis of the high-frequency component obtained at the NLE circuit. In that case, the original signal cannot be accurately reproduced.

SUMMARY OF THE INVENTION

It is a general object of this invention to solve the above-stated problem of the prior art.

It is a more specific object of the invention to provide a video signal processing device which is capable of accurately carrying out a non-linear emphasis process and a non-linear deemphasis process even in cases where the signal is of a wide band.

Under this object, a video signal processing device which is arranged according to this invention as an embodiment thereof comprises: input means for receiving a digital video signal; an infinite impulse response digital filter arranged to receive the digital video signal from the input means; look-up table means for looking up a table by using an output signal of the filter as an address, the look-up table means having a non-linear input-output characteristic; and addition means for adding together the digital video signal received from the input means and an output signal of the look-up table means.

A video signal processing device which is arranged in accordance with this invention as another embodiment thereof comprises: input means for receiving a digital video signal; first subtraction means arranged to receive as one of inputs thereof the digital video signal from the input means; look-up table means for looking up a table by using an output signal of the first subtraction means as an address, the look-up table means having a non-linear input-output characteristic; second subtraction means for subtracting an output signal of the look-up table means from the digital video signal received from the input means; and an infinite impulse response digital filter arranged to receive a signal obtained through the first subtraction means, an output signal of the filter being supplied to the other input of the first subtraction means.

Further, a video signal processing device which is arranged in accordance with this invention as a further embodiment thereof comprises: input means for receiving a digital video signal; look-up table means for looking up a table by using the digital video signal received from the input means as a part of address and for producing a non-linearly deemphasized digital video signal; and feedback means arranged to receive an output signal of the look-up table means and to supply, as another part of address, to the look-up table means a low-frequency component of the output signal of the look-up table means.

It is another object of the invention to provide a video signal processing device which is capable of performing an emphasis process by effectively using a dynamic range without causing any aliasing noise in a line-sequential color-difference signal.

Under that object, a video signal processing device arranged according to this invention an an embodiment thereof comprises: input means for receiving a plurality of color-difference signals; filters arranged to limit, at least in vertical direction of a picture, bands of the plurality of color-difference signals received from the input means respectively; line-sequential conversion means for converting into a line-sequential color-difference signal the plurality of color-difference signals received through the filters; and nonlinear emphasis means, arranged to receive the line-sequential color-difference signal, for non-linearly emphasizing a high-frequency component of the line-sequential color-difference signal.

The above and other objects and features of the invention will become apparent from the following detailed description of embodiments thereof taken in connection with the accompanying drawings.

DESCRIPTION OF THE DRAWINGS

FIGS. 19(A) to 19(E) show the action of each part of FIG. 18.

DETAILED DESCRIPTION OF THE PREFERRED EMBODIMENTS

Figure 6:
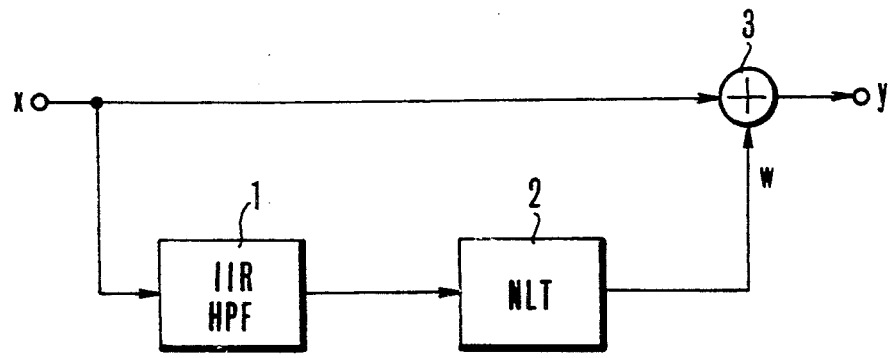
FIG. 6 shows the arrangement of an emphasis circuit which is arranged according to this invention as an embodiment thereof.

The embodiments of the invention are described below with reference to the accompanying drawings:

FIG. 6 shows the arrangement of an emphasis circuit which is arranged according to this invention as an embodiment thereof. Referring to FIG. 6, an infinite impulse response digital filter 1 (hereinafter referred to as an IIR filter) is arranged to pass the high-frequency component of an input digital signal x. A non-linear table (hereinafter referred to as NLT) 2 is arranged to logarithmically compress the output of the IIR filter 1. A reference numeral 3 denotes an adder.

Figure 7:
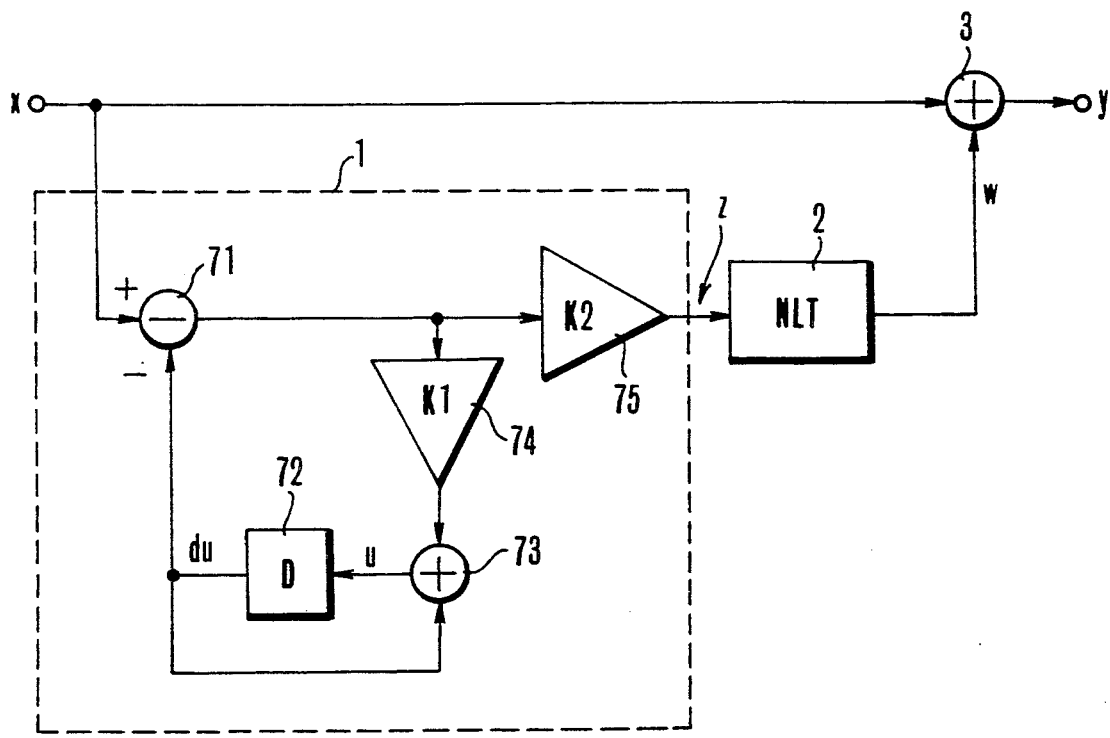
FIG. 7 shows by way of example the details of an IIR filter included in FIG. 6.

FIG. 7 shows in detail the arrangement of the IIR filter 1 included in the circuit of FIG. 6. Referring to FIG. 7, the IIR filter 1 includes a subtracter 71; a delay circuit 72 which is composed of a flip-flop; an adder 73; a coefficient multiplier 74 which is arranged to perform a multiplying operation with a coefficient K1; and a coefficient multiplier 75 which is arranged to perform a multiplying operation with a coefficient K2. The IIR filter 1 is composed of these elements 71 to 75.

In the above-stated arrangement, the input signal is assumed to be a digital video signal which is obtained by digitizing an analog video signal by means of an A/D converter (not shown). All processes described below are carried out by digital computation.

Referring to FIG. 6, the input digital signal x is supplied to the IIR filter 1. The IIR filter 1 then allows only the high-frequency component of the signal x to pass. The output data of the IIR filter 1 is supplied to the NLT 2. The NLT 2 is a ROM having a table written therein. The table is arranged in such a way as to produce logarithmically compressed data which corresponds to the input data. A high-frequency component w of the video signal is thus obtained in a state of being non-linearly amplitude-compressed by the NLT 2. The compressed high-frequency component w is supplied to the adder 3 to be added to the input digital signal x. As a result, an output video signal y is produced with the high-frequency component thereof emphasized. With the IIR filter 1 appositely arranged as described below, an HPF having the same characteristic as the conventional HPF which consists of a capacitor and a resistor is obtained. This, therefore, gives an emphasizing characteristic equivalent to that of the conventional device.

FIG. 7 shows the IIR filter as arranged in close resemblance to the HPF consisting of the capacitor and the resistor (CR). The input digital signal x is supplied to the subtracter 71. The output of the subtracter 71 is supplied via the coefficient multiplier 74 to an accumulator (or integrator) which consists of the adder 73 and the delay circuit 72. Further, a high-pass filter is formed by arranging the output of this accumulator to be fed back to the subtracter 71. The output of the subtracter 71 is produced via the coefficient multiplier 75 as the output z of the IIR filter 1.

A transfer function H(z) for the transfer from the input x to the output z can be expressed as follows:

$$H(z) = K2 \frac{1 - z^{-1}}{1 - (1 - K1)z^{-1}} \qquad (1)$$

wherein K1 and K2 represent the coefficients of the coefficient multipliers 74 and 75. This transfer function H(z) can be made approximately equivalent to the transfer function of the HPF 41 which consists of a capacitor and a resistor (CR) by setting the coefficients K1 and K2 as follows with an input signal sampling frequency assumed to be T and the time constant of the HPF 41 assumed to be CR:

$$\left. \begin{array}{l} K1 = 1 - e^{-T/CR} \\ K2 = e^{-T/2CR} \end{array} \right\} \qquad (2)$$

Figure 8:
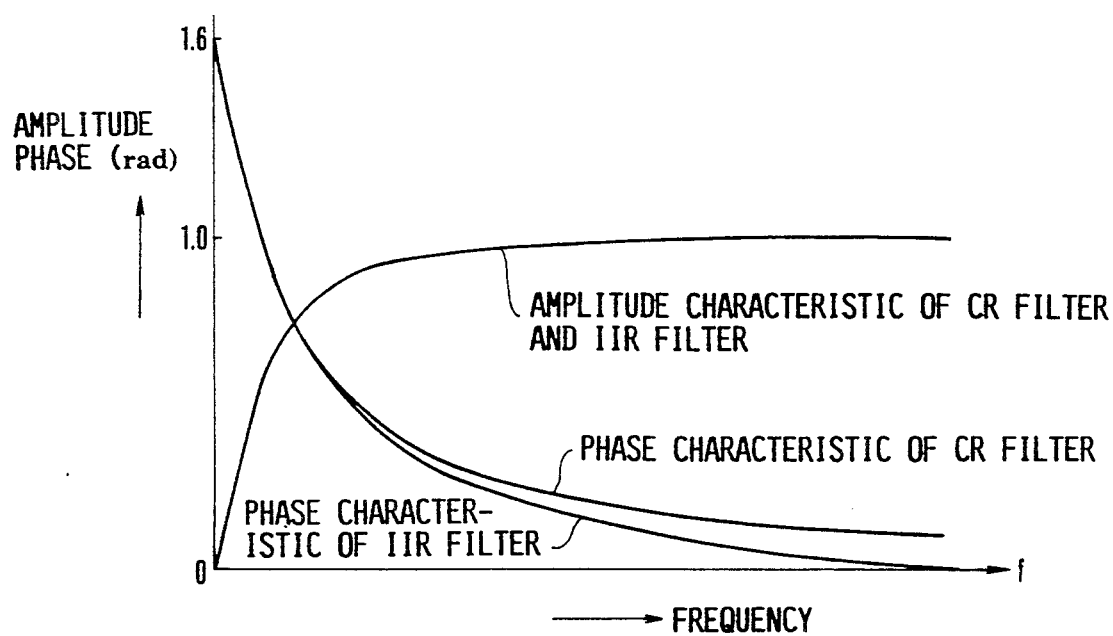
FIG. 8 shows by way of example the frequency transmission characteristic of the emphasis circuit of FIG. 6.

FIG. 8 shows a frequency transfer characteristic obtained from Formula (1) together with the frequency transfer characteristic of the HPF obtained by the capacitor C and the resistor R. As apparent from FIG. 8, the IIR filter of the transfer function H(z) has about the same frequency transfer characteristic as the conventional filter consisting of the capacitor C and the resistor R.

The emphasis circuit which is arranged as described above has about the same characteristic as a non-linear emphasizing characteristic obtainable by an ideal analog circuit. The arrangement to effect the non-linear amplitude compression by means of the table permits a highly accurate non-linear process. Further, the computing circuit can be arranged in a relatively simple manner. A signal of a band which is as wide as permissible by the highest possible computing speed thus can be processed.

In the case of the embodiment described, both the input and the output are in the form of digital video signals. However, in cases where the invention is applied to an analog signal processing system adapted for an analog VTR or the like, an A/D converter is arranged in front of the circuit of FIG. 6 and a D/A converter in the rear of the circuit respectively.

Further, the NLT of the embodiment is arranged to have a logarithmical compression characteristic. This characteristic may be changed to any desired characteristic such as a polygonal-line compression characteristic. Therefore, the digital arrangement of the embodiment gives a compression characteristic which is hardly obtainable by an analog circuit. It also gives a stable emphasizing characteristic having such a large emphasizing degree that is hardly obtainable by an analog circuit in terms of stability.

Figure 9:
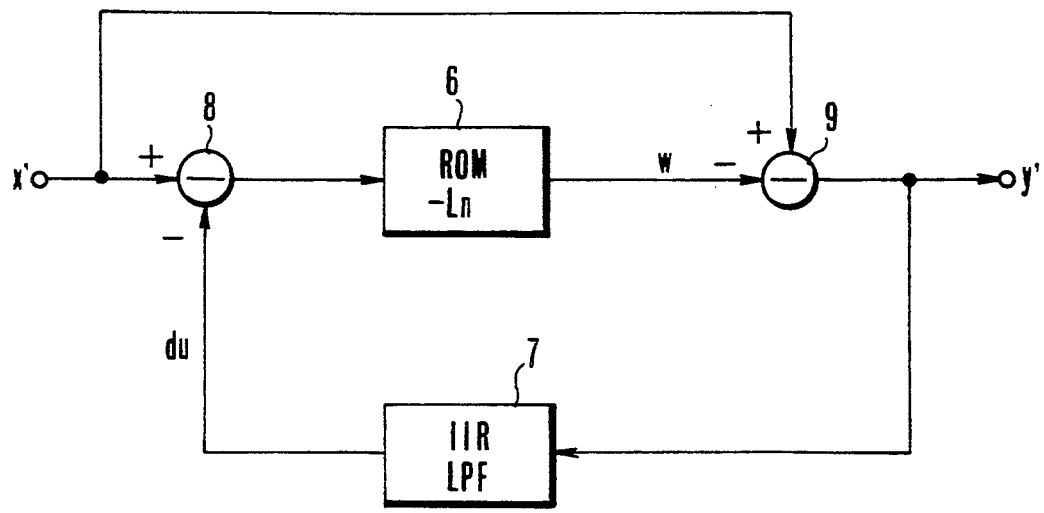
FIG. 9 shows the arrangement of a deemphasis circuit which is arranged according to this invention as an embodiment thereof.

FIG. 9 shows the arrangement of a deemphasis circuit which is arranged also as an embodiment of this invention. Referring to FIG. 9, a ROM 6 is arranged to receive a difference between an input digital signal x' and the output du of an IIR filter and to have data which conforms to a non-linear compression characteristic written therein in the form of a table. An IIR-LPF 7 is formed with the IIR filter into a low-pass filter (LPF) which has the same time constant as the HPF 41 of the deemphasis circuit of FIG. 2. A subtracter 9 is arranged to obtain a difference between the output w of the ROM 6 and the input data (digital signal) x' and to produce a deemphasis output y'. Another subtracter 8 is arranged to obtain a difference between the input x' and the output du of the IIR-LPF 7.

Figure 10:
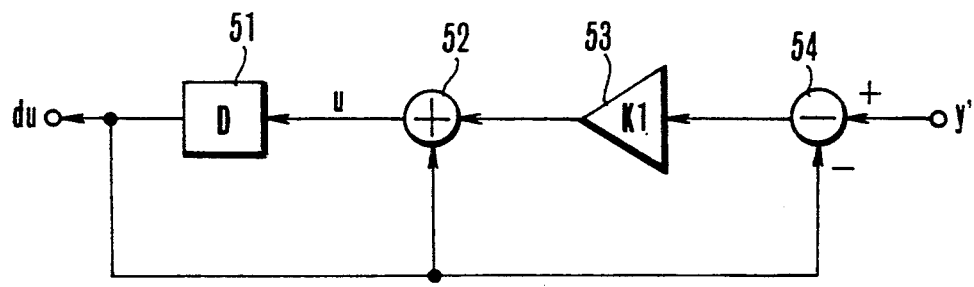
FIG. 10 shows by way of example the details of an IIR filter included in FIG. 9.

FIG. 10 shows in detail the arrangement of the IIR-LPF 7 included in the deemphasis circuit of FIG. 9. Referring to FIG. 10, a subtracter 54 is arranged to obtain a difference between the deemphasis output y' and the output du of the IIR-LPF 7. A coefficient multiplier 53 is arranged to multiply the output of the subtracter 54 by a coefficient k1. An adder 52 is arranged to add together the output of the coefficient multiplier 53 and the output du of the IIR-LPF 7. A D-type flip-flop (DFF) 51 is arranged to delay the output u of the adder 52 as much as one sampling period.

Figure 2:
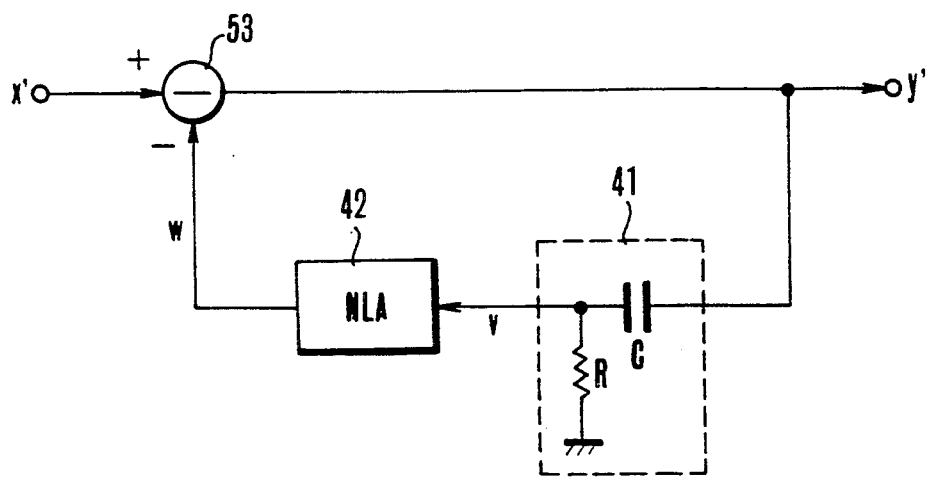
FIG. 2 shows by way of example the arrangement of the conventional non-linear deemphasis circuit.
Figure 3:
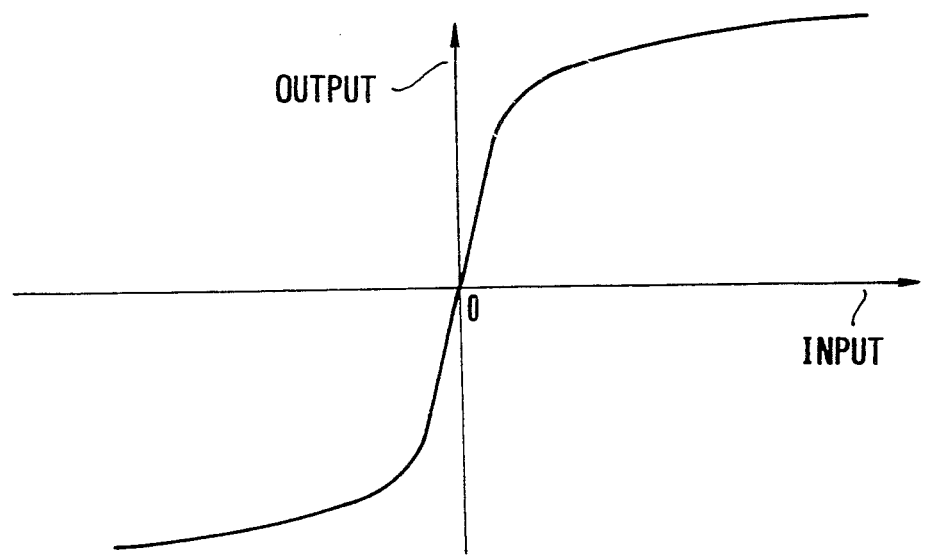
FIG. 3 shows the input-output characteristic of a non-linear amplifier included in FIG. 1.
Figure 4:
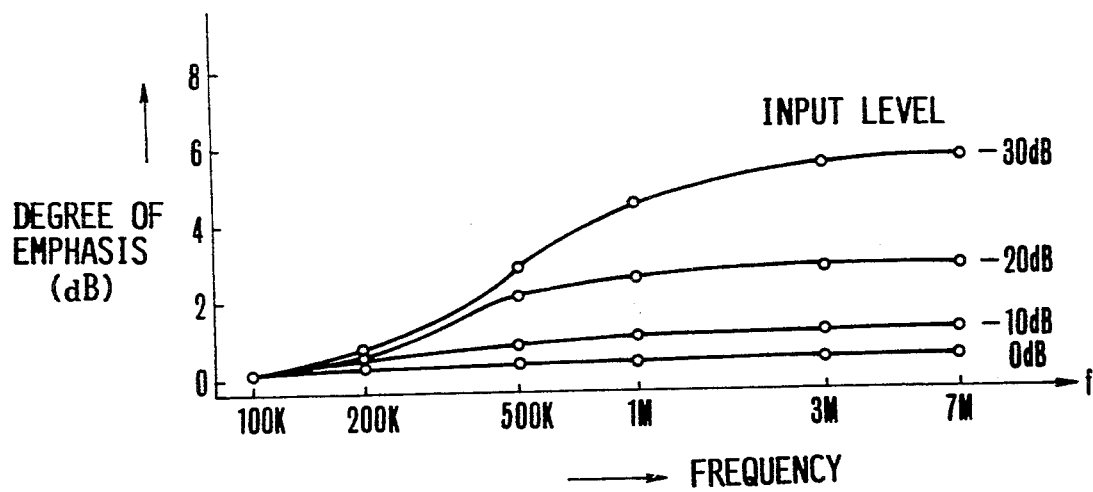
FIG. 4 shows the frequency characteristic of the emphasis circuit of FIG. 1.
Figure 5:
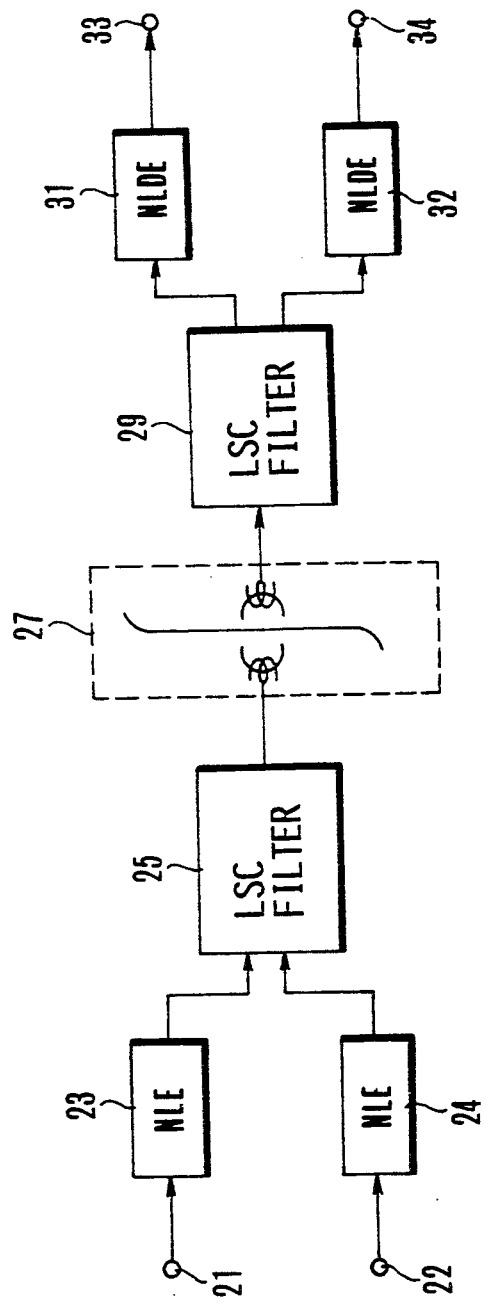
FIG. 5 shows in outline the arrangement of the conventional recording and reproducing apparatus which is arranged to perform a line-sequential conversion process and non-linear emphasizing and deemphasizing processes on color-difference signals.

Before description of the deemphasis circuit of the embodiment shown in FIGS. 9 and 10, the process of forming the HPF 41 and the NLA 42 included in the deemphasis circuit of FIG. 2 from digital circuits is described as follows: Referring to FIG. 2, with the sampling period for the input data assumed to be T, the time constant of the HPF 41 to be CR and the coefficients determined by the time constant CR to be K1 and K2, the transfer function from the deemphasis output y' to the output v of the HPF 41 is arranged to be as expressed below:

$$\frac{v}{y'} = K2 \frac{1-z^{-1}}{1-z^{-1}(1-K1)} \quad (3)$$
$$K1 = 1 - e^{-T/CR}$$
$$K2 = e^{-T/2CR}$$

Therefore, by selecting this transfer function, an IIR filter is arranged to have a characteristic which approximately coincides with the characteristic of the HPF 41 having the capacitor C and the resistor R. Further, the characteristic of the NLA 42 can be defined by means of a ROM which has a logarithmically compressed data table written therein. The characteristic is expressed as follows:

$$w = Kn[v] \quad (4)$$

wherein Kn represents a function having a non-linear characteristic.

The deemphasis circuit is eventually arranged to produce an output y' which is expressed as follows:

$$y' = x' - w \quad (5)$$
$$= x' - Kn\left[K2\left(\frac{1-z^{-1}}{1-z^{-1}(1-K1)} y'\right)\right]$$

In actually forming a digital circuit in accordance with Formula (5), the formula is modified in the following manner, because a feedback loop must be separated by means of the D-type flip-flop:

Formula (3) is first modified and the output du is arranged as expressed below:

$$du = \frac{K1 z^{-1}}{1 - z^{-1}(1-K1)} y'$$

Then, the following relation is obtained:

$$v = K2\left(\frac{1-z^{-1}}{1-z^{-1}(1-K1)}\right) y' \quad (6)$$
$$= K2\left(y' - \frac{K1 z^{-1}}{1 - z^{-1}(1-K1)} y'\right)$$
$$= K2(y' - du)$$

The output du is delayed to a degree of one data relative to the output y'. Formula (6) is substituted for Formula (5) as follows:

$$y' = x' - Kn[K2(y' - du)] \quad (7)$$

Further, $y' = x' - w$ is substituted to modify this. Then, the following relation is obtained with $Kn^{-1}$ used as the inverse function of Kn:

$$x' - du = \frac{1}{K2} Kn^{-1}[w] + w \quad (8)$$

Formula (8) can be expressed as follows as a function for obtaining the value w with a value $x' - du$ used as a variable:

$$w = Ln[x' - du] \quad (9)$$

Then, the deemphasis output y' can be computed as x' − w. FIG. 9 shows this in a block diagram.

The value du is computed by the IIR-LPF 7. A difference (x' − du) between the input signal x' and the output data du of the IIR-LPF 7 is obtained by the subtracter 8. Then, at the ROM 6 in which a data table corresponding to the function Ln of Formula (9), the value w is obtained. The deemphasis output y' is produced by obtaining a difference between the input x' and the value w through the subtracter 9. The output y' is supplied to the IIR-LPF 7 to obtain the above-stated FIG. 10 shows the arrangement of the IIR filter for obtaining the output du from the output y'. As mentioned above, the output du can be expressed as follows:

$$du = \frac{K1 z^{-1}}{1 - z^{-1}(1-K1)} y'$$

Therefore, data u which is obtained before the data du is obtained by delaying it can be expressed as:

$$u = \frac{du}{z^{-1}} = du + K1\,(y' - du) \tag{10}$$

Therefore, the IIR filter is arranged as shown in FIG. 10. Since the data du is latched by the DFF 51 as apparent from FIG. 10, a feedback loop can be formed as shown in FIG. 9. Further, Formula (8) can be modified by substituting the relation of y'=x'−w and Formula (9) as shown below:

$$(y' - du)\,K1 = \frac{K1}{K2}\,Kn^{-1}[w] \tag{11}$$
$$= \frac{K1}{K2}\,Kn^{-1}[Ln[x' - du]]$$

With the right side of Formula (11) expressed by one function Mn, it can be rearranged as follows:

$$(y'-du)\,K1 = Mn\,[x'-du] \tag{12}$$

Figure 11:
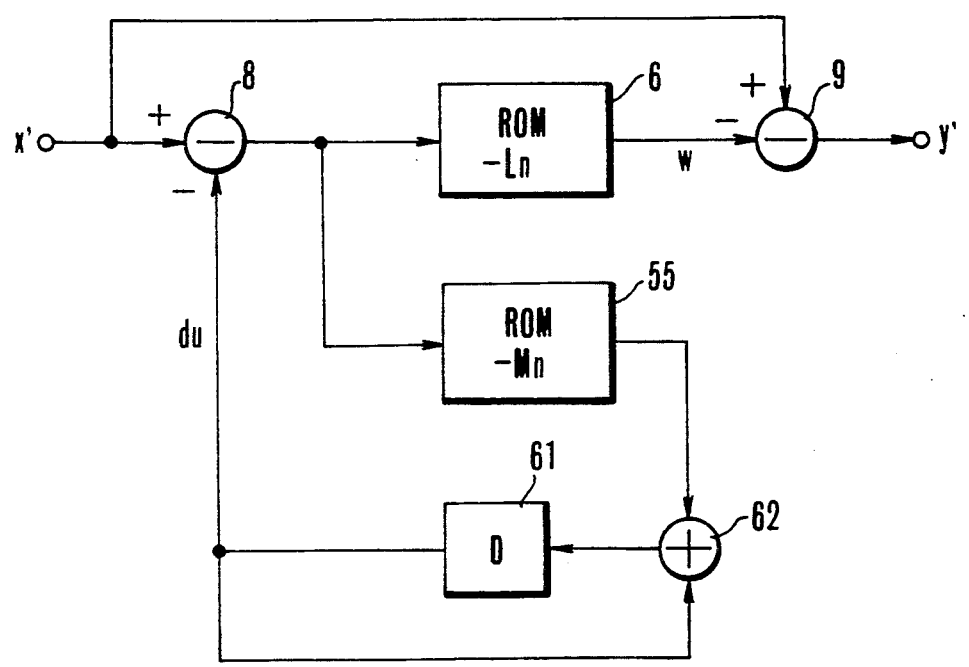
FIG. 11 shows the arrangement of a deemphasis circuit which is arranged as another embodiment of this invention.

Then, by obtaining the function Mn by means of the ROM table 6, the deemphasis circuit can be arranged as shown in FIG. 11. Referring to FIG. 11, a circuit which corresponds to the IIR-LPF 7 of FIG. 9 is formed jointly by a ROM 55 which is arranged to receive the output of a subtracter 8 and is formed in the shape of a table according to Formula (12), an adder 62 and a DFF 61. According to this arrangement, a computing operation can be carried out on a loop from the output of the DFF 61 through the input thereof by means of only the ROM, the adder and the substracter. Therefore, computation can be carried out at a higher speed than in the case of the embodiment shown in FIG. 9.

The above-stated arrangement gives a deemphasis circuit having a characteristic similar to the non-linear deemphasis characteristic obtained by an ideal analog circuit. In addition to this, the non-linear amplitude compression effected by the table in accordance with the above-stated arrangement permits a highly accurate non-linear process. Further, the computing circuit itself is of a relatively simple arrangement. A signal having as wide a band as permissible by the highest possible computing speed can be processed.

In the case of the embodiment described, both the input and the output are assumed to be digital video signals. However, the invented arrangement is also applicable with a minor modification to an analog signal processing system. In that case, an A/D converter is provided in front of the circuit of FIG. 9 or 11 and a D/A converter in the rear of the circuit.

Further, the embodiment described is assumed to have a logarithmic compression characteristic as an example of non-linear characteristics. However, this can be changed to a desired characteristic such as a polygonal-line compressing characteristic by varying the table. Therefore, a compressing characteristic that is impossible with an analog circuit can be obtained. By virtue of this, for example, a deemphasis characteristic capable of coping with such a large degree of emphasis that is otherwise hardly permissible in terms of stability can be stably attained.

Figure 12:
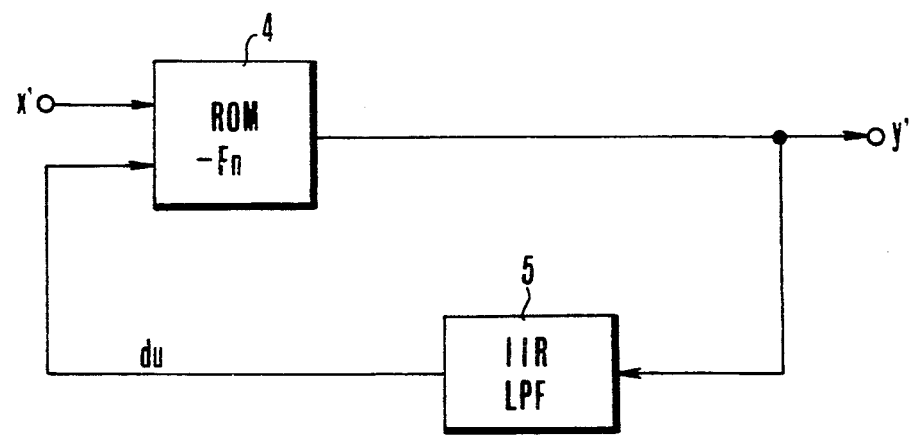
FIG. 12 shows the arrangement of a deemphasis circuit which is arranged as a further embodiment of the invention.

FIG. 12 shows the arrangement of a deemphasis circuit which is arranged also according to this invention as a further embodiment thereof. Referring to FIG. 12, a ROM (read-only memory) 4 which has a data table written therein beforehand and is arranged to receive an input digital signal x' and the output du of an infinite impulse response digital filter (IIR filter) and to produce a deemphasis output y'. An IIR-LPF 5 forms, with the IIR filter, an LPF which has the same time constant as the conventional HPF 41 of FIG. 2.

Figure 13:
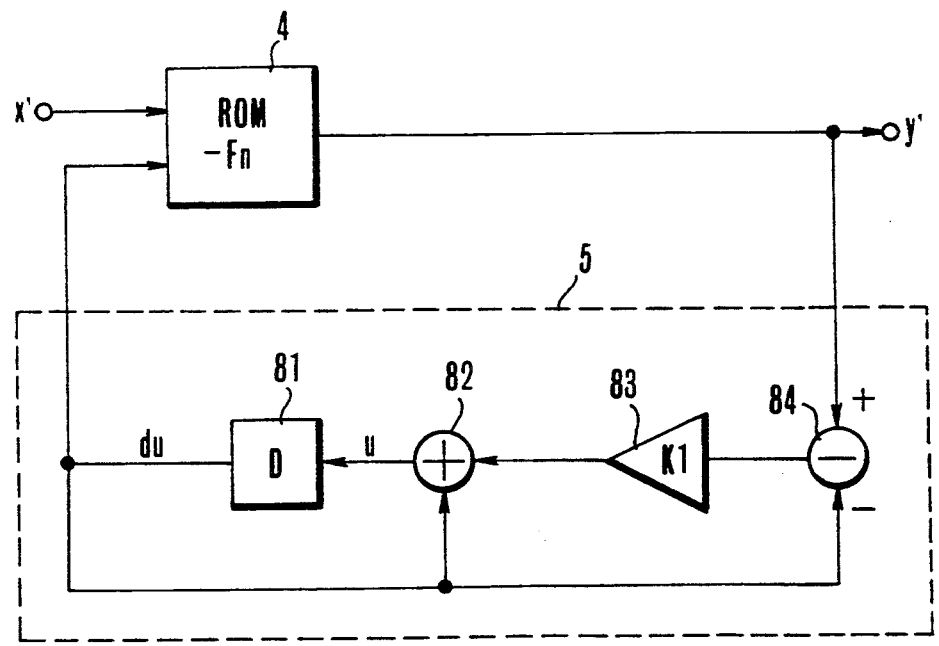
FIG. 13 shows by way of example the details of an IIR filter included in FIG. 12.

FIG. 13 shows in detail the arrangement of the IIR-LPF 5 of the deemphasis circuit of FIG. 12. In FIG. 13, the same component parts as those of FIG. 12 are indicated by the same reference numerals.

Referring to FIG. 13, a subtracter 84 is arranged to obtain a difference between the deemphasis output y' and the output du of the IIR-LPF 5. A coefficient multiplier 83 is arranged to multiply the output of the subtracter 84 by a coefficient K1. An adder 82 is arranged to add together the output of the coefficient multiplier 83 and the output du of the IIR-LPF 5. A D-type flip-flop (DFF) 81 is arranged to delay the output u of the adder 82 for one sampling period.

Formula (7) shown in the foregoing is provided for obtaining the output y' by using the values x' and du. Therefore, it can be expressed as the function Fn [ ] as follows:

$$y' = Fn\,[x',\,du] \tag{13}$$

This is expressed in a block diagram as shown in FIG. 12. The value du is computed by the IIR-LPF 5 and the deemphasis output y' can be obtained by supplying the values x' and du to the ROM 4 which has Formula (13) written therein in the form of a table.

In other words, the IIR-LPF 5 of FIG. 13 is arranged to obtain the value du from the deemphasis output y'. Since the data du is expressed as follows:

$$du = \frac{K1\,z^{-1}}{1 - z^{-1}(1 - K1)}\,y'$$

the data u which is obtained before the delay can be expressed as follows:

$$u = \frac{du}{z^{-1}} = du + K1\,(y' - du) \tag{14}$$

Therefore, the IIR filter is arranged as shown in FIG. 13.

As apparent from FIG. 13, the data du is latched by the DFF 81, a feedback loop can be formed as shown in FIG. 12. Further, with Formula (13) substituted for Formula (14), the data u of Formula (14) can be expressed as the function of data x' and du as shown below:

$$\begin{aligned} u &= du + K1\,(Fn\,[x',\,du] - du) \\ &= Gn\,[x',\,du] \end{aligned} \tag{15}$$

Figure 14:
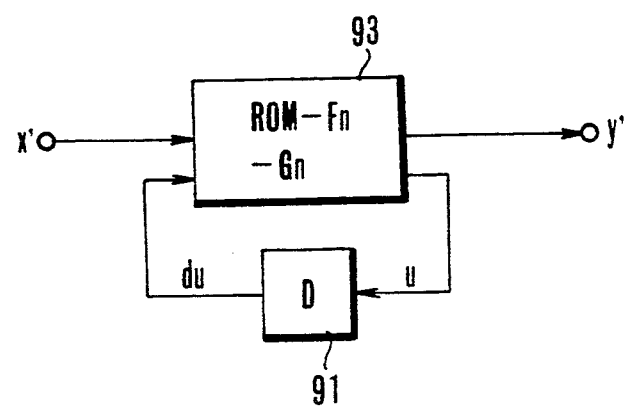
FIG. 14 shows the arrangement of a deemphasis circuit which is arranged also according to this invention as a further embodiment thereof.

Therefore the data u also can be arranged into the form of a table by supplying the data x' and du. FIG. 14 shows a circuit embodying this concept. The circuit includes a ROM 93 and a DFF 91. The input x' and the output du of the DFF 91 are supplied to the ROM 93. The functions of Formulas (13) and (15) are written in the ROM 93 in the form of a table. The ROM 93 produces an output y' and another output u which is supplied to the DFF 91.

In accordance with the arrangement described, a deemphasis circuit can be arranged to have a characteristic which is similar to a non-linear deemphasis characteristic obtainable by an ideal analog circuit. Besides, according to the arrangement, a non-linear process can be highly accurately carried out by virtue of non-linear amplitude compression effected by means of the table. Further, the circuit is capable of processing a signal of as wide a band as permissible by the computing speed of the computing circuit within the feedback circuit. Therefore, the circuit of the embodiment shown in FIG. 14 is capable of more speedily performing the process than the circuit of the embodiment shown in FIG. 12. However, the circuit of the embodiment shown in FIG. 14 necessitates the use of a table of a larger storage capacity than the circuit of the embodiment shown in FIG. 12.

Further, in the embodiment described, both the input and the output are assumed to be digital video signals. However, the arrangement is also applicable to an analog signal processing system which is used for an analog VTR or the like. In that case, an A/D converter is provided in front of the circuit of FIG. 12 or 14 and a D/A converter in the rear of the circuit.

The embodiment described is assumed to have a logarithmic compression characteristic as an example of possible non-linear characteristics. However, it can be changed to some other desired characteristic, such as a polygonal-line compression characteristic. This enables the embodiment to have such a compression characteristic that is hardly attainable with an analog circuit. Therefore, a deemphasis characteristic for such a large degree of emphasis that is otherwise hardly permissible in terms of stability can be stably attained.

Figure 15:
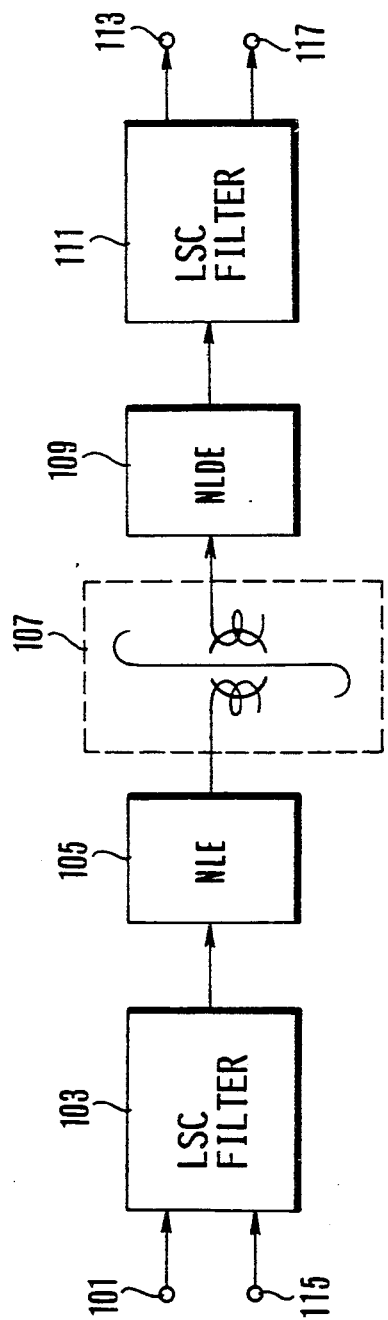
FIG. 15 shows in outline the arrangement of the essential parts of a magnetic recording and reproducing apparatus which is arranged as an embodiment of the invention.

Next, a line-sequential color-difference signal recording and reproducing apparatus which is modified and improved according to this invention as an embodiment thereof is described below:

FIG. 15 shows in outline the arrangement of the parts of a magnetic recording and reproducing apparatus essentially related to the invention. The essential parts include only the parts arranged to process a line-sequential color-difference signal. Referring to FIG. 15, input terminals 101 and 115 are arranged to receive digital color-difference signals PR and PB respectively. A line-sequential filter circuit (hereinafter referred to as an LSC filter) 103 is arranged to limit the bands of the input color-difference signals PR and PB in the vertical direction of the image and, after that, to convert them into a line-sequential color-difference signal. The illustration includes an NLE circuit 105; a magnetic recording and reproducing system 107; an NLDE circuit 109; and an LSC filter 111 which is arranged to perform on the color-difference signals PR and PB of the line-sequential color-difference signal a filtering process corresponding to the process of the LSC filter 103 and to produce the color-difference signals PR and PB of the whole line. Output terminals 113 and 117 are arranged to output color-difference signals PR and PB.

Figure 18:
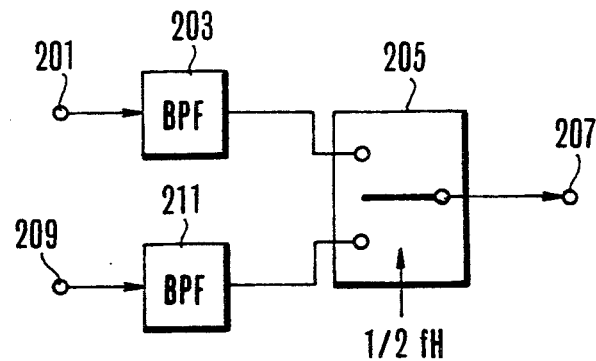
FIG. 18 shows by way of example the details of an LSC filter included in FIG. 15.

The digital color-difference signals PR and PB supplied to the input terminals 101 and 115 are supplied to the LSC filter 103. FIG. 18 shows in detail the arrangement of this LSC filter 103. Referring to FIG. 18, terminals 201 and 209 are arranged to receive color-difference signals PR and PB respectively. The color-difference signals PR and PB as received are supplied to band-pass filters (BPFs) 203 and 211 which are arranged to limit the bands of these signals in the vertical direction of an image respectively. The outputs of the BPFs 203 and 211 are supplied to a switching circuit 205. The switching circuit 205 is arranged to alternately produce and supply to a terminal 207 the band-limited color-difference signals PR and PB for every horizontal scanning period.

FIGS. 19(A) to 19(E) show the actions of parts shown in FIG. 18. In these figures, marks "o" indicate the picture elements of the color-difference signal PR and marks "x" those of the other color-difference signal PB. Each transverse line indicates a horizontal scanning line. Recording or reproduction is performed for the picture elements from above toward the bottom one after another as viewed on these figures.

FIG. 19(A) shows the picture elements of the color-difference signal PR which is supplied to the terminal 201. FIG. 19(B) shows the picture elements of the color-difference signal PB which is supplied to the terminal 209. Each of FIGS. 19(C) and 19(D) shows the process of a filtering action on these picture elements. In other words, each of the BPFs 203 and 211 performs a computing operation on each picture element including picture elements located adjacent thereto in the vertical direction. Then, filtered picture elements are obtained by forming data by adding a given weighting value to these picture elements. This computing operation is performed on all the picture elements. As a result, filtered color-difference signals PR and PB are output from the BPFs 203 and 211.

Figure 20:
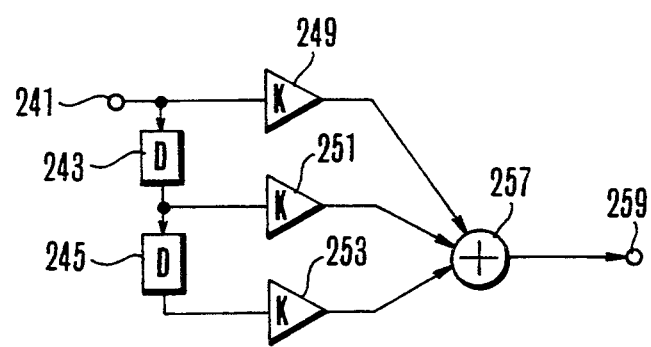
FIG. 20 shows by way of example the arrangement of a BPF included in FIG. 18.

FIG. 20 shows by way of example the details of arrangement of each of the BPFs 203 and 211 of FIG. 18. Referring to FIG. 20, the illustration includes an input terminal 241 for the digital color-difference signal; one-horizontal-scanning-period delay lines 243 and 245; coefficient multipliers 249, 251 and 253 which are arranged to multiply the color-difference signals by predetermined coefficients; an addition circuit 257; and a terminal 259 which is arranged to produce the output of the addition circuit 257 after filtering.

The filtered color-difference signals PR and PB are supplied to the switching circuit 205. The outputs of the BPFs 203 and 211 are thus alternately produced to give a line-sequential color-difference signal as shown in FIG. 19(E).

Figure 1:
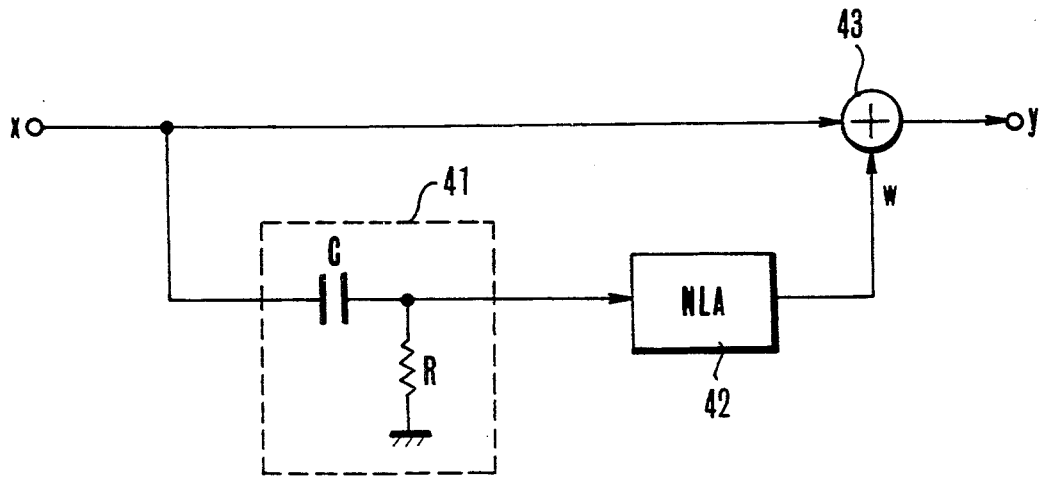
FIG. 1 shows by way of example the arrangement of the conventional non-linear emphasis circuit.
Figure 17:
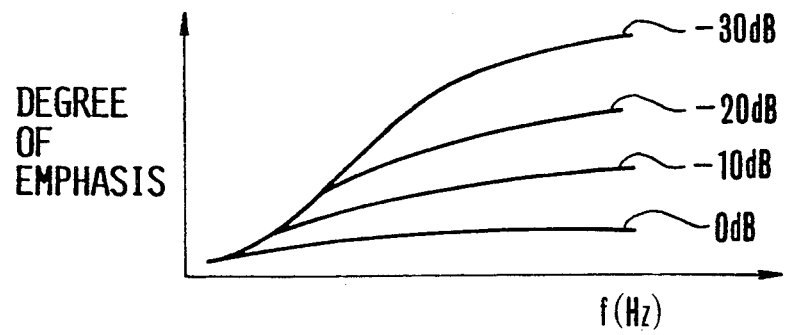
FIG. 17 shows the characteristic of an emphasis (NLE) circuit included in FIG. 15.

The line-sequential color-difference signal thus produced by the LSC filter 103 is supplied to the NLE circuit 105. For the NLE circuit 105, the circuit shown in FIG. 1 or 6 is usable. The signal output from the NLE circuit 105 has its high-frequency component emphasized to a degree which varies with the level of the input signal as shown in FIG. 17. As shown, a non-linear emphasis characteristic is obtained.

The output of the NLE circuit 105 is supplied to the magnetic recording and reproducing system 107 to be recorded on a recording medium.

The signal reproduced by the magnetic recording and reproducing system 107 is supplied to the NLDE circuit 109 which is of a characteristic reverse to that of the NLE circuit 105. The high-frequency component of the reproduced signal is suppressed by the NLDE circuit 109. Further, the NLDE circuit 109 can be arranged on the same concept as the NLE circuit of FIG. 2 or 9. Therefore, the details of the arrangement of the NLDE circuit 109 are omitted from description. The NLDE circuit 109 produces a line-sequential color-difference signal of an adequate S/N ratio. This signal is supplied to the LSC filter 111.

At the LSC filter 111, each of the color-difference signals PR and PB is supplied for every other line to the filter which is arranged as shown in FIG. 20. As a result, the color-difference signals PR and PB of all the lines are output.

In the magnetic recording and reproducing apparatus of FIG. 15, as described above, the signal level remains unchanged through the processes performed by the circuit elements from the NLE circuit 105 to the NLDE circuit 109. Therefore, the filtered line-sequential color-difference signal can be accurately restored to its original state. Further, the circuit arrangement of the apparatus can be simplified as it requires only one NLE circuit 105 and one NLDE circuit 109.

Figure 16A:
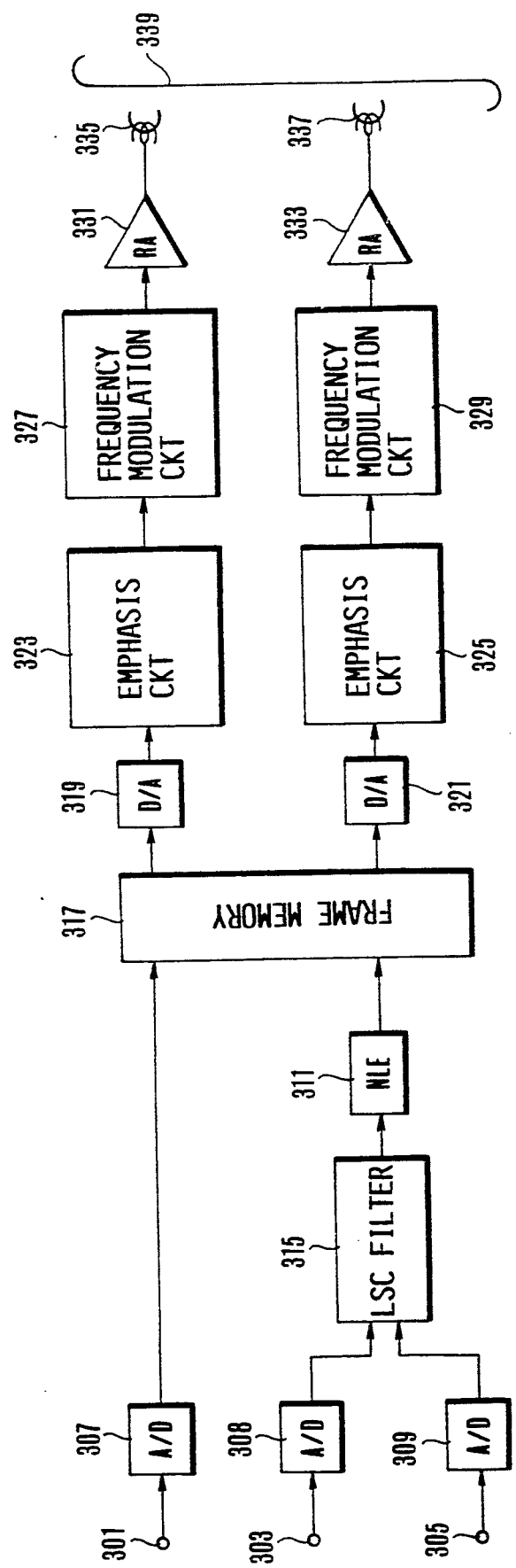
FIGS. 16(A) and 16(B) show the whole arrangement of a VTR to which this invention is applied.
Figure 16B:
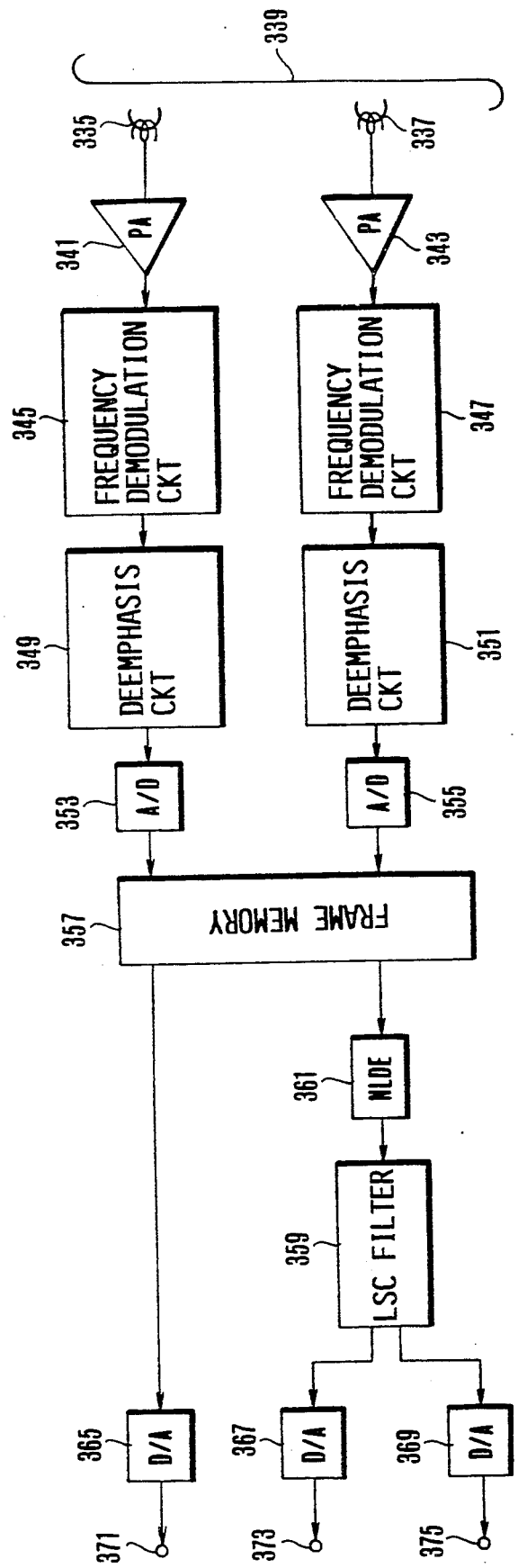

FIGS. 16(A) and 16(B) jointly show the arrangement of a whole VTR to which this invention is applied. The recording system of the VTR is arranged as shown in FIG. 16(A) while the reproducing system of the VTR is arranged as shown in FIG. 16(B). Referring to the drawings, an input terminal 301 is arranged to receive an analog luminance signal. Input terminals 303 and 305 are arranged to receive analog color-difference signals PR and PB respectively. These signals are supplied to A/D converters 307, 308 and 309 to be digitized respectively.

The digital color-difference signals PR and PB thus obtained are supplied to an LSC filter 315. The LSC filter 315 is arranged to convert these signals PR and PB into a line-sequential color-difference signal after limiting their bands in the vertical direction of the image. A line-sequential digital color-difference signal thus obtained through the LSC filter 315 is supplied to an NLE circuit 311. The NLE circuit 311 is arranged to perform the non-linear high-frequency component emphasizing process with the digital signal processed as an input and an output. The line-sequential digital color-difference signal which has its high-frequency component non-linearly emphasized and the digital luminance signal which comes from the A/D converter 307 are supplied to a frame memory 317. The frame memory 317 is arranged to compress the time base of the luminance signal and that of the line-sequential color-difference signal and to multiplex them in a time sharing manner. After that, the multiplex signal is divided into two channels for the purpose of reducing the amount of information of a single channel.

The signals of two channels are supplied to D/A converters 319 and 321 to be converted into analog signals. The analog signals thus obtained are supplied to emphasis circuits 323 and 325. The emphasis circuits 323 and 325 are arranged to emphasize the high-frequency components of the signals which are obtained by multiplexing the luminance signal and the line-sequential color-difference signal. The outputs of the emphasis circuits 323 and 325 are supplied to frequency-modulation circuits 327 and 329 to be frequency-modulated. The frequency-modulated analog signals of two channels which are thus obtained are recorded on a magnetic tape 339 which is a recording medium through recording amplifiers (RAs) 331 and 333 and magnetic recording/reproducing heads 335 and 337.

In reproducing the recorded signal, the signals of two channels which are reproduced from the magnetic tape 339 by the heads 335 and 337 are amplified by reproduction amplifiers 341 and 343. The amplified signals are supplied to frequency demodulation circuits 345 and 347. The outputs of the frequency demodulation circuits 345 and 347 are supplied to deemphasis circuits 349 and 551 which are of a characteristic reverse to that of the emphasis circuits 323 and 325. The high-frequency components of these signals are thus compressed. The outputs of the deemphasis circuits 349 and 351 are converted into digital signals by A/D converters 353 and 355. These digital signals are supplied to a frame memory 357. At the frame memory 357, these digital signals are converted into single-channel signals in a manner reverse to the action of the frame memory 317. After that, the luminance signal and the line-sequential color-difference signal thus obtained are time-base-expanded. Then, the digital luminance signal and the line-sequential digital color-difference signal are produced in parallel.

The digital luminance signal is converted into an analog signal by a D/A converter 365. The analog luminance signal is output from a terminal 371. The line-sequential digital color-difference signal is supplied to an NLDE circuit 361 to have its high-frequency component non-linearly compressed in a manner reverse to the action of the NLE circuit 311. The output of the NLDE circuit 361 is supplied to an LSC filter 359. At this LSC filter 359, the line-sequential digital color-difference signal is almost perfectly restored to its original state.

As mentioned in the foregoing, at the LSC filter 359, the digital color-difference signals PR and PB are separated from each other. The digital color-difference signals PR and PB of the whole line are thus produced. The digital color-difference signals PR and PB are supplied to D/A converters 367 and 369 to be converted into analog signals. The analog color-difference signals thus obtained are output from output terminals 373 and 375.

The VTR shown in FIGS. 16(A) and 16(B) is capable of high-frequency-emphasizing both the luminance signal and the color-difference signals by means of one and the same circuit. Besides, the non-linear high-frequency emphasizing process can be accomplished for both the colordifference signals by one and the same circuit. Therefore, the circuit arrangement can be simplified. Further, the signal level remains unchanged through the processes performed between the NLE circuit 311 and the NLDE circuit 361, so that the color-difference signals can be accurately restored to their original states.

Each of the embodiments described is arranged to transmit a video signal to a recording medium. However, this invention is not limited to this. The invention is applicable in general to any cases where video signals are to be transmitted through such a transmission line that teems with noises.

What is claimed is:

1. A video signal processing device comprising:
   (a) input means for receiving a digital video signal;
   (b) an infinite impulse response digital highpass filter arranged to receive the digital video signal from said input means, said high-pass filter including a subtracter arranged to receive as one of inputs thereof the digital video signal from said input means, a coefficient multiplier arranged to multiply an output digital signal of said subtracter by a predetermined coefficient, and an accumulator arranged to accumulate an output digital signal of said coefficient multiplier and to supply an output digital signal thereof to the other input of said subtracter;
   (c) look-up table means for looking up a table by using an output digital signal of said filter as an address, said look-up table means having a non-linear input-output characteristic; and (d) addition means for adding together the digital video signal received from said input means and an output digital signal of said look-up table means.

2. A device according to claim 1, wherein the coefficient of said coefficient multiplier is expressed as $e^{-T/CR}$ where a sampling interval of the digital video signal received from said input means is assumed to be T and a time constant of said digital high-pass filter is assumed to be CR.

3. A device according to claim 1, wherein said accumulator includes an adder arranged to receive the output digital signal of said coefficient multiplier as one of inputs thereof, and delay means arranged to delay an output signal of said adder for a predetermined period of time to be supplied to said subtracter and said adder.

4. An emphasis circuit comprising:
(a) an infinite impulse response digital high-pass filter arranged to receive a digital video signal, said high-pass filter including a subtracter arranged to receive as one of inputs thereof the digital video signal from said input means, a coefficient multiplier arranged to multiply an output digital signal of said subtracter by a predetermined coefficient, and an accumulator arranged to accumulate an output digital signal of said coefficient multiplier and to supply an output digital signal thereof to the other input of said subtracter;
(b) look-up table means for looking up a table by using an output digital signal of said filter as an address, said look-up table circuit having a non-linear input-output characteristic; and
(c) an addition circuit arranged to add together the digital video signal to be supplied to said filter and an output digital signal of said look-up table circuit and to produce the digital video signal whose high-frequency component has been emphasized.

5. A video signal processing device comprising:
(a) input means for receiving a digital video signal;
(b) first subtraction means arranged to receive as one of inputs thereof the digital video signal from said input mans;
(c) look-up table means for looking up a table by using an output digital signal of said first subtraction means as an address, said look-up table means having a non-linear input-output characteristic;
(d) second subtraction means for subtracting an output digital signal of said look-up table means from the digital video signal received from said input means; and
(e) an infinite impulse response digital low-pass filter arranged to receive an output digital signal of said second subtraction means, an output digital signal of said filter being supplied to an other input of said first subtraction means.

6. A device according to claim 5, wherein said low-pass filter includes a subtracter arranged to receive as one of inputs thereof the digital output signal of said second subtraction means, a coefficient multiplier arranged to multiply an output digital signal of said subtracter by a predetermined coefficient, and an accumulator arranged to accumulate an output digital signal of said coefficient multiplier and to supply an output digital signal thereof to the other input of said subtracter.

7. A device according to claim 6, wherein said accumulator includes an adder arranged to receive as one of inputs thereof the output digital signal of said coefficient multiplier, and delay means arranged to delay an output digital signal of said adder for a predetermined period of time to be supplied to said subtracter and said adder.

8. A video signal processing device comprising:
(a) input means for receiving a digital video signal;
(b) first subtraction means arranged to receive as one of inputs thereof the digital video signal from said input means;
(c) first look-up table mans for looking up a table by using an output digital signal of said first subtraction means as an address, said look-up table means having a non-linear input-output characteristic;
(d) second subtraction means for subtracting an output digital signal of said first look-up table mans from the digital video signal received from said input means;
(e) second look-up table means for looking up a table by using the output digital signal of said first subtraction means as an address; and
(f) accumulation means for accumulating an output digital signal of said second look up table means and to supply an output digital signal thereof to an other input of said first subtraction means.

9. A deemphasis circuit comprising:
(a) a first subtracter arranged to receive a digital video signal as one of inputs thereof;
(b) a look-up table circuit arranged to look up a table by using an output digital signal of said first subtracter as an address, said look-up table circuit having a non-linear input-output characteristic;
(c) a second subtracter arranged to subtract an output digital signal of said look-up table circuit from the digital video signal and to produce a digital video signal whose high-frequency component has been suppressed; and
(d) an infinite impulse response digital low-pass filter arranged to receive the digital video signal produced by said second subtracter and to supply an output digital signal thereof to the other input of said first subtracter.

10. A video signal processing device comprising:
a) input means for receiving a digital video signal;
b) look-up table means for looking up a table by using the digital video signal received from said input means as a part of address and for producing a non-linearly deemphasized digital video signal; and
c) feedback means arranged to receive an output signal of said look-up table means and to supply, as another part of address, to said look-up table means a low-frequency component of the output signal of said look-up table means.

11. A device according to claim 10, wherein said feedback means includes an infinite impulse response digital low-pass filter arranged to receive the digital video signal output from said look-up table means.

12. A device according to claim 11, wherein said filter includes a subtracter arranged to receive as one of inputs thereof the digital video signal output from said look-up table means, a coefficient multiplier arranged to multiply an output signal of said subtracter by a predetermined coefficient, and an accumulator arranged to accumulate an output signal of said coefficient multiplier and to supply an output signal thereof to the other input of said subtracter.

13. A device according to claim 10, wherein said look-up table means is arranged to produce, along with the non-linearly deemphasized digital video signal, a signal related to a low-frequency component of the non-linearly deemphasized digital video signal, and wherein said feedback means includes a delay circuit arranged to delay for a predetermined period of time said signal related to the low-frequency component to be supplied to said look-up table means as said another part of address.

14. A video signal processing device comprising:
(a) first input means for receiving a plurality of color difference signals;
(b) filters arranged to limit, at least in the vertical direction of a picture, bands of the plurality of color-difference signals received from said first input means respectively;
(c) line-sequential conversion means for converting into a line-sequential color-difference signal the plurality of color-difference signals received through said filters;
(d) non-linear emphasis means, arranged to receive the line-sequential color-difference signal, for non-linearly emphasizing a high-frequency component of the line-sequential color-difference signal;
(e) second input means for receiving a luminance signal;
(f) time-division multiplexing means arranged to time-divisionally multiplex the line-sequential color-difference signal output from said non-linear emphasis means and the luminance signal received from said second input means and to produce a multiplex signal; and
(g) emphasizing mans for emphasizing a high-frequency component of the multiplex signal.

* * * * *

UNITED STATES PATENT AND TRADEMARK OFFICE
CERTIFICATE OF CORRECTION

PATENT NO. : 5,144,434
DATED : September 1, 1992
INVENTOR(S) : Shinichi Yamashita and Mitsugu Tanaka It is certified that error appears in the above-identified patent and that said Letters Patent is hereby corrected as shown below:

Abstract 13. Change "subtractor" to -- subtracter --
Col. 8, line 57. After "above-stated" insert -- data du --
Col. 9, line 32. Change "substracter" to -- subtracter --
Col. 14, line 37. Change "colordifference" to -- color difference --
Col. 15, line 28. Change "look-up" to -- a look-up --
Col. 15, line 28. Change "means for looking up" to -- circuit arranged to look-up --
Col. 15, line 41. Change "mans" to -- means --
Col. 16, lines 8 and 13. Change "mans" to -- means --
Col. 16, line 20. Change "look up" to -- look-up --
Col. 18, line 15. Change "mans" to -- means --

Signed and Sealed this

Twenty-first Day of September, 1993

Attest:

BRUCE LEHMAN

Attesting Officer

Commissioner of Patents and Trademarks